(12) United States Patent
Tan

(10) Patent No.: US 8,363,398 B2
(45) Date of Patent: Jan. 29, 2013

(54) ELECTRONIC DEVICE WITH HEAT DISSIPATION CASING

(75) Inventor: Zeu-Chia Tan, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 255 days.

(21) Appl. No.: 12/910,852

(22) Filed: Oct. 24, 2010

(65) Prior Publication Data
US 2012/0069515 A1   Mar. 22, 2012

(30) Foreign Application Priority Data
Sep. 16, 2010   (TW) .............................. 099131355 A

(51) Int. Cl.
*H05K 7/20*   (2006.01)
(52) U.S. Cl. ................... 361/679.54; 361/704; 361/707; 361/708
(58) Field of Classification Search .......................... None
See application file for complete search history.

(56) References Cited

U.S. PATENT DOCUMENTS

| | | | |
|---|---|---|---|
| 5,991,155 A * | 11/1999 | Kobayashi et al. ........... | 361/705 |
| 6,064,573 A * | 5/2000 | Morton ......................... | 361/704 |
| 7,168,484 B2 * | 1/2007 | Zhang et al. .................. | 165/185 |
| 7,417,863 B2 * | 8/2008 | Park .............................. | 361/719 |
| 7,965,514 B2 * | 6/2011 | Hill et al. ...................... | 361/707 |
| 2012/0033384 A1 * | 2/2012 | Pillai ............................. | 361/718 |

* cited by examiner

*Primary Examiner* — Boris Chervinsky
(74) *Attorney, Agent, or Firm* — Altis Law Group, Inc.

(57) ABSTRACT

An electronic device includes a casing, an electronic component accommodated in the casing; and a composite heat conductive layer between the casing and the electronic component. The composite heat conductive layer includes a graphite layer and a thermal pad layer between the electronic component and the graphite layer. The thermal pad layer is attached to the electronic component. The graphite layer is attached to an inner surface of the casing. The graphite layer is located between the casing and the thermal pad layer. Heat conductive efficiency of the graphite layer along a horizontal spreading direction thereof exceeds that along a vertical thickness direction thereof. A surface area of the graphite layer is not less than that of the electronic component. Heat generated by the electronic component is evenly transferred and is spread to the casing via the graphite layer of the composite heat conductive layer.

14 Claims, 2 Drawing Sheets

ELECTRONIC DEVICE WITH HEAT DISSIPATION CASING

BACKGROUND

1. Technical Field

The present disclosure generally relates to electronic devices, and particularly to an electronic device having a composite heat conductive layer for transferring heat of an electronic component to a casing thereof for heat dissipation.

2. Description of Related Art

Electronic components for electronic devices, such as CPUs (central processing units) for computers, generate heat in operation. The heat must be dissipated immediately, to avoid overheating and damaging the electronic component. A heat sink is mounted in a casing of the electronic device and thermally attached to the electronic component to dissipate heat from the electronic component.

However, the trend towards miniaturization of electronic devices leaves insufficient space therein for accommodating the heat sink. Thermally attaching the electronic component to the casing of the electronic device makes use of the casing for heat dissipation. Generally, the electronic component has high heat density. If the electronic component of the electronic device is attached to the casing of the electronic device, a hot spot is formed on the casing, adversely affecting the heat conductive efficiency between the electronic component and the casing, and making use of the electronic device uncomfortable for the user.

Accordingly, what is needed is an electronic device which can overcome the described limitations.

BRIEF DESCRIPTION OF THE DRAWINGS

Many aspects of the embodiment can be better understood with reference to the following drawings. The components in the drawings are not necessarily drawn to scale, the emphasis instead placed upon clearly illustrating the principles of the present disclosure. Moreover, in the drawings, like reference numerals designate corresponding parts throughout the views.

DETAILED DESCRIPTION

Figure 1:
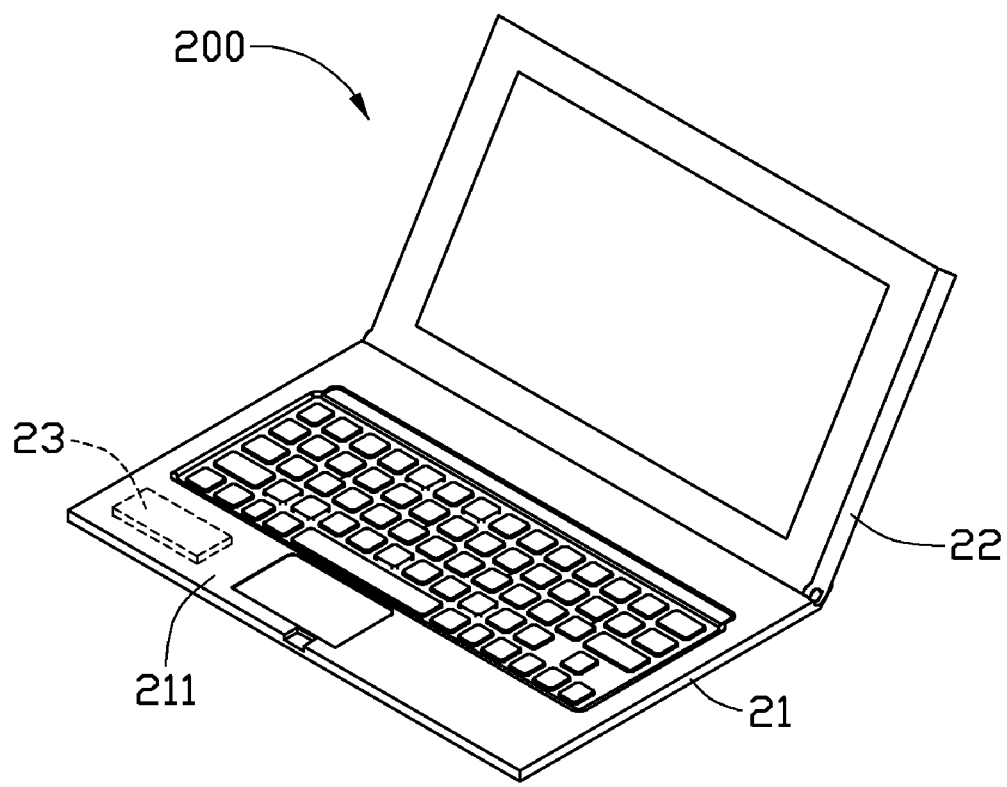
FIG. 1 is an isometric, assembled view of an electronic device according to an embodiment of the present disclosure.

FIG. 1 shows an electronic device 200 according to an embodiment of the present disclosure. In the embodiment, the electronic device 200 is a notebook computer. The electronic device 200 includes a mainframe 21, and a display unit 22 rotatably mounted on the mainframe 21. The mainframe 21 includes a casing 211, an electronic component 212 (referring to FIG. 2) received in the casing 211, and a composite heat conductive layer 23 received in the casing 211 and disposed between the electronic component 212 and the casing 211. The electronic component 212 may for example include a number of processors or random access memory (RAM). The electronic component 212 is located under the composite heat conductive layer 23. During operation of the electronic device 200, heat generated by the electronic component 212 is evenly transferred to the casing 211 with the composite heat conductive layer 23 and is dissipated by the casing 211.

Figure 2:
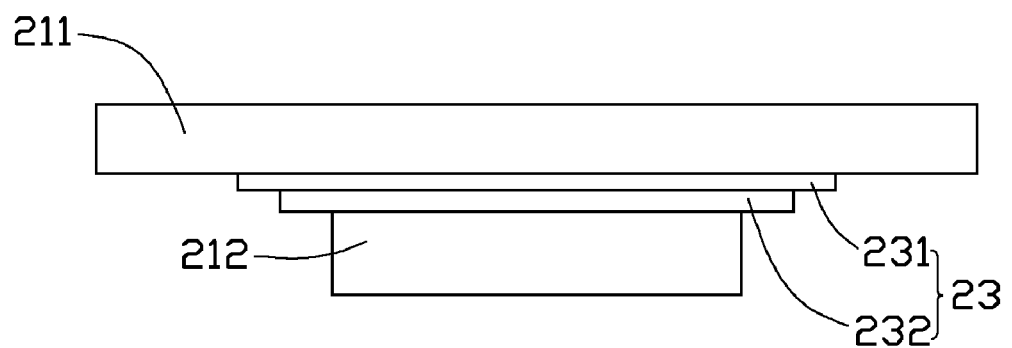
FIG. 2 is a schematic view of a heat dissipation structure of the electronic device of FIG. 1.

Referring to FIG. 2, the composite heat conductive layer 23 includes a graphite layer 231 and a thermal pad layer 232. The graphite layer 231 is thermally attached to an inner surface of the casing 211. The thermal pad layer 232 is thermally attached to the electronic component 212.

The graphite layer 231 is a sheet of graphite. The graphite layer 231 has good heat spreading capability, i.e. heat conductive efficiency of the graphite layer 231 along a horizontally spreading direction thereof exceeds that along a vertically thickness direction thereof. Heat conductive efficiency of the graphite layer 231 along the horizontally spreading direction thereof is about 450 W/m·K to about 750 W/m·K. The heat conductive efficiency of a metallic casing along a horizontally spreading direction thereof is approximately 50 W/m·K, and heat conductive efficiency of a thermal pad along a horizontally spreading direction thereof is about 1 W/m·K to about 3 W/m·K. Therefore, the heat spreading capability of the graphite layer 231 is much greater than that of metallic casing and thermal pad. A surface area of the graphite layer 231 is not less than that of a top surface of the electronic component 212 which faces the casing 211. In one embodiment, the ratio between a length of the graphite layer 231 and a length of the electronic component 212 is about 1.5:1 to about 1:1. In one embodiment, the ratio between a width of the graphite layer 231 and a width of the electronic component 212 is about 1.5:1 to about 1:1. In addition, the graphite layer 231 can absorb electromagnetic radiation generated by the electronic component 212 during operation.

The thermal pad layer 232 is disposed between the graphite layer 231 and the top surface of the electronic component 212. The thermal pad layer 232 is a layer of thermal conductive film or a layer of thermal conductive grease, which decreases thermal resistance between the graphite layer 231 and the electronic component 212. The thermal pad layer 232 also acts as a strength buffer layer to avoid damage to the graphite layer 231 and the electronic component 212. In addition, the thermal pad layer 232 is an electrical insulator between the graphite layer 231 and the electronic component 212. A surface area of the thermal pad layer 232 is not less than that of the electronic component 212 but not larger that that of the graphite layer 231. In one embodiment, the ratio between a length of the graphite layer 231 and a length of the thermal pad layer 232 is about 1.5:1 to about 1:1. In one embodiment, the ratio between a width of the graphite layer 231 and a width of the thermal pad layer 232 is about 1.5:1 to about 1:1. If the graphite layer 231 and the thermal pad layer 232 have approximately the same length and width, the graphite layer 231 has the best heat spreading effect.

During operation of the electronic device 200, heat generated by the electronic component 212 is transferred to the graphite layer 231 via the thermal pad layer 232. The heat is evenly transferred and spread to the casing 211 of the electronic device 200 via the graphite layer 231. Because the graphite layer 232 has good heat spreading capability, the heat distribution on the casing 211 is even, and the hot spot on the casing 211 is eliminated.

It is to be understood that even though numerous characteristics and advantages of the embodiment(s) have been set forth in the foregoing description, together with details of the structures and functions of the embodiment(s), the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electronic device comprising:
a casing;
an electronic component accommodated in the casing; and a composite heat conductive layer between the casing and the electronic component, the composite heat conductive layer comprising a graphite layer and a thermal pad layer, the graphite layer being a sheet of graphite;

wherein the thermal pad layer is attached to a top surface of the electronic component, the graphite layer is attached to an inner surface of the casing, the thermal pad layer is located between the electronic component and the graphite layer, the graphite layer is located between the casing and the thermal pad layer, a heat conductive coefficient of the graphite layer along a horizontal spreading direction thereof exceeds that along a vertical thickness direction thereof, and a surface area of the graphite layer is not less than that of the top surface of the electronic component, such that heat generated by the electronic component is evenly transferred and spread to the casing via the graphite layer of the composite heat conductive layer.

2. The electronic device of claim 1, wherein a ratio between a length of the graphite layer and a length of the top surface of the electronic component is in the range of about 1.5:1 to about 1:1.

3. The electronic device of claim 2, wherein a ratio between a width of the graphite layer and a width of the top surface of the electronic component is in the range of about 1.5:1 to about 1:1.

4. The electronic device of claim 1, wherein the surface area of the graphite layer is not less than that of the thermal pad layer.

5. The electronic device of claim 1, wherein a ratio between a length of the graphite layer and a length of the thermal pad layer is in the range of about 1.5:1 to about 1:1.

6. The electronic device of claim 5, wherein a ratio between a width of the graphite layer and a width of the thermal pad layer is in the range of about 1.5:1 to about 1:1.

7. The electronic device of claim 1, wherein the thermal pad layer is a layer of thermal conductive film or a layer of thermal conductive grease.

8. The electronic device of claim 1, wherein the thermal pad layer is an electrical insulator between the graphite layer and the electronic component.

9. The electronic device of claim 1, wherein the electronic device is a notebook computer.

10. The electronic device of claim 1, wherein the sheet of graphite is continuous.

11. The electronic device of claim 1, wherein the graphite layer is directly attached to the inner surface of the casing.

12. An electronic device comprising:
a casing;
an electronic component accommodated in the casing; and
a composite heat conductive layer between the casing and the electronic component, the composite heat conductive layer comprising a graphite layer and a thermal pad layer, the graphite layer being a sheet of graphite;
wherein the thermal pad layer is attached to a top surface of the electronic component, the graphite layer is attached to an inner surface of the casing, the thermal pad layer is located between the electronic component and the graphite layer, the graphite layer is located between the casing and the thermal pad layer, a heat conductive coefficient of the graphite layer along a direction from the thermal pad to the casing exceeds that along a direction perpendicular to the inner surface of the casing, and a surface area of the graphite layer is not less than that of the top surface of the electronic component, such that heat generated by the electronic component is evenly transferred and spread to the casing via the graphite layer of the composite heat conductive layer.

13. The electronic device of claim 12, wherein the sheet of graphite is continuous.

14. The electronic device of claim 12, wherein the graphite layer is directly attached to the inner surface of the casing.

* * * * *